United States Patent [19]

Wessel

[11] 3,898,523

[45] Aug. 5, 1975

[54] LINE DEFLECTION CIRCUIT FOR CATHODE RAY TUBE

[76] Inventor: Peter Lorentz Wessel, Donskitoppen 10 E, 1346 Gjettum, Norway

[22] Filed: Oct. 3, 1973

[21] Appl. No.: 403,342

[30] Foreign Application Priority Data

Oct. 4, 1972 Norway .............................. 3549/72

[52] U.S. Cl. .................................. 315/408; 315/403
[51] Int. Cl. ............................................. H01j 29/70
[58] Field of Search ................................ 315/28–29, 315/27 R, 27 TD, 18, 403, 364, 408; 307/228

[56] References Cited

UNITED STATES PATENTS

| | | | |
|---|---|---|---|
| 3,688,153 | 8/1972 | Wheatley | 315/27 TD |
| 3,814,981 | 6/1974 | Rusk | 315/27 TD |

*Primary Examiner*—Maynard R. Wilbur
*Assistant Examiner*—J. M. Potenza
*Attorney, Agent, or Firm*—Watson, Cole, Grindle & Watson

[57] ABSTRACT

The invention is related to a line deflection circuit for cathode ray tubes, particularly picture tubes for TV receivers. This deflection circuit comprises a parallel resonant circuit connected in parallel with a diode and consisting of a deflection coil in series with a charging condenser in one of the parallel branches and a return trace capacitor in the other branch. In operation the resonant circuit is supplied with current from a d.c. source through an inductance, e.g. the primary winding of a line deflection transformer, and periodically short-circuited at the line deflection rate by means of a pulse controlled switch supplied with pulses from a pulse generator. According to the invention, the end of the parallel resonant circuit which is not connected with the series inductance, is connected through separate diodes with the d.c. source and ground potential, respectively, thus making the resonant circuit part of a bridge circuit.

4 Claims, 2 Drawing Figures

LINE DEFLECTION CIRCUIT FOR CATHODE RAY TUBE

The present invention is concerned with a line deflection circuit for cathode ray tubes, in particular picture tubes for TV receivers, provided with an electromagnetic deflection coil which works under such conditions that it may for all practical purposes be regarded as a pure inductance.

In modern TV receivers such circuits are normally designed to be used in conjunction with semiconductor active elements. However, if the receivers are designed to be operated from 220 volts a-c, rectification of this voltage will produce a d-c voltage of around 300 volts. If a conventional line deflection circuit is connected directly to this d-c voltage, the peak return trace pulse voltage across the circuit will be approximately 3,000 volts, which exceeds the rating of conventional transistors.

To be practical the d-c voltage employed for driving the circuit must be reduced in some way or other. In principle, this may be easily achieved, of course, by means of a suitable transformer or by a voltage-divider network. Special condenser or thyristor circuits have also been employed for this purpose.

All these known methods suffer from the disadvantages that the receiver must contain extra components, meaning further cost and higher weight, besides perhaps unwanted electromagnetic stray fields and heat. Furthermore, the reliability of the receiver will clearly diminish with proliferation of parts and rising temperature.

Lately the present problem has been solved by employing a regular line deflection circuit in conjunction with a d-c voltage converter, which works in such a way that every active element will always be fully conducting or fully non-conducting. In this way high efficiency and negligible heating is achieved. A diagram of such a circuit, described in Norwegian Pat. No. 123.469, is shown in FIG. 1. When activated, the circuit functions in the following manner:

When the controlled coupler unit T, which in this case is a transistor, is fully conducting, the entire voltage $V_b$ (300 V) of the d-c source will appear across the primary winding of a transformer TF. The current through this winding will increase linearly with time while magnetic energy is stored in the transformer TF. At the same time the coupler unit T, in conjunction with diode D2, will provide a voltage across the deflection coil L equal to the voltage across the forward trace capacitor C3. When coupler unit T is cut off at the completion of the forward trace, the deflection coil L and the return trace condenser C2 will resonate and reverse the deflection coil current. At the same time energy stored in the transformer TF will be transferred through diode D1 to the aforementioned resonant circuit. During the first half of the forward trace diode D3 will ensure that the voltage across the forward trace capacitor C3 also appears across the deflection coil L.

Voltages and currents appearing in the parallel resonant circuit C2/L/C3 will depend upon the energy transfer to this circuit from the transformer TF. As is well known, the magnitudes of these voltages and currents may be regulated by controlling the duration of the pulses to coupler unit T.

FIG. 1 shows clearly that a transformer TF is required for transfer of energy from the d-c source $V_b$. This transformer must be matched to the circuit. Furthermore, another capacitor C4 will actually be needed across diodes D1 and D2, to protect them against parasitic oscillations in the transformer TF.

The main purpose of the present invention is therefore to simplify the circuit just described without detracting from its useful properties, and in such a way that the transformer TF may be replaced by an inductance (L2 in FIG. 2), which may be the primary winding of a standard line deflection transformer.

The invention thus comprises a line deflection circuit for cathode ray tubes, in particular picture tubes in TV receivers, which is provided with a parallel resonant circuit in parallel with a first diode, the resonant circuit consisting of a deflection coil in series with a charging capacitor in one branch and a return trace capacitor in another. The characteristic feature of this circuit according to the invention is that one end of the resonant circuit is supplied with current from a d-c voltage source through an inductance, for example the primary winding of a line deflection transformer, while it also may be connected to ground potential through a switch which is controlled by a pulse generator in step with its pulse rate. The other end of the resonant circuit is connected to the d-c voltage source through one diode, and to ground potential through another diode, thus making the resonant circuit part of a bridge circuit.

The invention will be described in more detail by means of one particular embodiment, with reference to the drawings.

Figure 1:
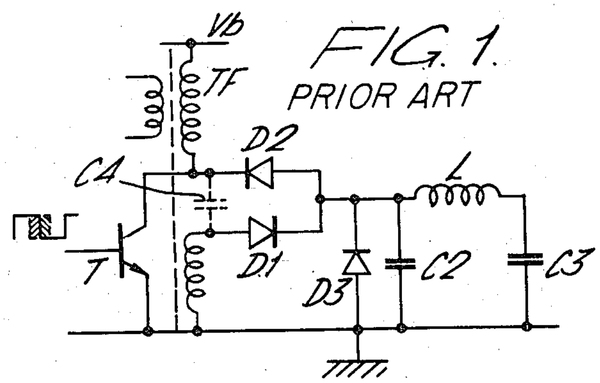
FIG. 1. PRIOR ART
FIG. 1 shows a previously known deflection circuit, adjustable by means of pulse width modulation of the signal governing the switch element.
Figure 2:
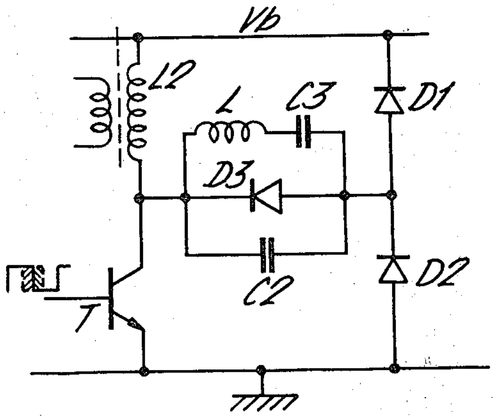
FIG. 2 shows a circuit exhibiting the same characteristic feature as that of FIG. 1, but which according to the invention comprises a choke in place of a transformer as the energy transfer element.

The known circuit of FIG. 1 has already been described. The mode of operation of the new circuit of FIG. 2 is as follows:

When the controlled coupler unit T, which in this case is a transistor, is fully conducting, the entire voltage $V_b$ (300 V) of the d-c source will appear across the inductance L2. The current through this inductance will increase linearly with time, and magnetic energy will be stored. At the same time the coupler unit T and diode D2 will assure that the voltages across the deflection coil L and the forward trace capacitor C3 are equal.

When the coupler unit T is cut-off at the end of the forward trace, the deflection coil L and the return trace capacitor C2 will resonate, thus reversing the current in deflection coil L. Simultaneously energy stored in inductance L2 will be transferred through diode D1 to the resonant circuit. During the first half of the forward trace, immediately following the return trace, diode D3 will assure that the voltage existing across the forward trace capacitor C3 will equal that across the deflection coil L.

The coupler unit T is controlled by means of pulses from a pulse generator, the unit being fully conducting for the duration of the pulse, and non-conducting between pulses.

Coupler unit T must be conducting at least during the second half of the forward trace period. It may, however, conduct during varying portions of the first half of the interval, the only effect being variations of the amplitude of the deflection voltage. The voltages and currents of the parallel resonant circuit C2/L/C3 may thus be modulated, regulated, or stabilized by means of the duration of the control pulses. This control may be governed by the operating voltage $V_b$ of the d-c source, or by the voltages or currents of the parallel resonant circuit, by suitable feedback.

Voltages for various purposes may be obtained from a secondary winding coupled to inductance L2, as indicated in FIG. 2. As likewise indicated the control unit may preferentially be a suitable switching transistor T, but the invention is naturally not confined to this embodiment. The control unit or switch may thus be a thyristor, an electron tube, and even an electromagnetic switch if sufficiently fast, or any other suitable switching arrangement.

I claim:

1. Line deflection circuitry for cathode ray tubes, comprising:

a D.C. voltage source and an inductance connected thereto;

switch means connected to said D.C. voltage source through said inductance and controlled by input pulses;

first and second diodes serially connected to each other between said D.C. voltage source and ground for providing a line deflection output signal;

a third diode connected between said inductance at the junction of said switch means and said inductance and the junction of said first and second diodes; and a parallel resonant circuit connected in parallel with said third diode and including a deflection coil in series with a charging capacitor in one branch thereof, and a return trace capacitor in the other branch thereof.

2. Light deflection circuitry as in claim 1 further comprising a pulse generator for generating said input pulses and feedback means interconnecting said parallel resonant circuit with said pulse generator whereby the duration of said input pulses is controlled by said resonant circuit.

3. Light deflection circuitry as in claim 2 wherein said feedback means is connected to said parallel resonant circuit at the junction of said parallel resonant circuit with said inductance.

4. Light deflection circuitry as in claim 1 wherein said switch means is a transistor controlled to be conductive or non-conductive by said input pulses.

* * * * *